United States Patent [19]
Brown

[11] Patent Number: 6,120,230
[45] Date of Patent: Sep. 19, 2000

[54] ROLLER-INSERTER FOR USE WITH CARTRIDGE STYLE INFORMATION STORAGE MEDIA

[75] Inventor: Steven C. Brown, Broomfield, Colo.

[73] Assignee: Advanced Digital Information Corporation, Englewood, Colo.

[21] Appl. No.: 08/917,152

[22] Filed: Aug. 25, 1997

[51] Int. Cl.$^7$ .................................................. B65G 1/04
[52] U.S. Cl. ................... 414/273; 294/907; 364/478.03; 364/478.06; 414/280; 901/46; 360/92
[58] Field of Search .................................. 414/273, 274, 414/280, 282, 281, 283, 278, 277, 800, 806, 807, 659, 667, 618, 619; 364/478.02, 478.03, 478.06; 901/46, 47; 294/907; 360/92

[56] References Cited

U.S. PATENT DOCUMENTS

| | | | |
|---|---|---|---|
| 4,423,998 | 1/1984 | Inaba et al. ........................ | 294/907 X |
| 4,864,511 | 9/1989 | Moy et al. ............................ | 364/478 |
| 4,984,106 | 1/1991 | Herger et al. . | |
| 5,139,384 | 8/1992 | Tuttobene . | |
| 5,220,548 | 6/1993 | Nakatsukasa et al. . | |
| 5,226,779 | 7/1993 | Yeakley ................................ | 414/753 |
| 5,253,911 | 10/1993 | Egan et al. .............................. | 294/116 |
| 5,277,540 | 1/1994 | Helms et al. .......................... | 414/751 |
| 5,285,335 | 2/1994 | Sato ........................................ | 360/92 |
| 5,323,327 | 6/1994 | Carmichael et al. ................ | 364/478 |
| 5,345,350 | 9/1994 | Ellis et al. ............................. | 360/92 |
| 5,388,946 | 2/1995 | Baur ........................................ | 414/281 |
| 5,418,664 | 5/1995 | Ostwald .................................. | 360/92 |
| 5,450,391 | 9/1995 | Pollard .................................. | 369/191 |
| 5,460,476 | 10/1995 | Gazza ...................................... | 414/786 |
| 5,471,445 | 11/1995 | Emberty et al. . | |
| 5,513,947 | 5/1996 | Helms et al. ........................... | 414/751 |
| 5,622,470 | 4/1997 | Schaefer et al. . | |
| 5,641,264 | 6/1997 | Kuno et al. ........................ | 294/907 X |
| 5,688,013 | 11/1997 | Sehrt .................................... | 294/907 X |

OTHER PUBLICATIONS

International Search Report dated Nov. 17, 1998 (PCT/US98/17588)(ESYS:005P).

*Primary Examiner*—Frank E. Werner
*Attorney, Agent, or Firm*—Seed IP Law Group PLLC

[57] ABSTRACT

The present invention discloses methods and apparatus for use in a mass memory data storage system. The present invention includes a gripper assembly having a roller-inserter, which permits contact with a data cartridge to be retrieved from or archived in said data storage system. The present invention also includes methods to inventory cartridges in said data storage system using the roller-inserter to provide for a contact method of inventory. The present invention also provides for teach-mode probe functions and real-time cartridge position locators.

27 Claims, 4 Drawing Sheets

ROLLER-INSERTER FOR USE WITH CARTRIDGE STYLE INFORMATION STORAGE MEDIA

BACKGROUND OF THE INVENTION

The present invention relates to robotics, and more specifically to an apparatus and method for automated archiving and retrieval of cartridges, such as those used in computer systems, to and from a mass storage system. However, the present invention may also be used in the archiving and retrieval of audio cassettes and the like.

In computer system environments, it is known to use robotic systems to archive and retrieve computer data storage media such as computer tape cassettes. Specifically, these systems use a type of robotic arm and hand to archive to or retrieve a cassette from a specific location in a storage library. The system then provides the cassette to a cassette drive unit. Certain systems use a system having a track disposed between drive unit and storage library, and a carriage assembly for moving along the track.

Certain systems place a platform upon the carriage assembly on which the robotic arm and hand are located. The robotic arm moves to a desired location in a storage library and using the hand, which may have a plurality of fingers, grips and removes a cassette from the location. The robotic system may then move to the drive unit and release its fingers, thereby placing the cassette within the drive unit. When desired, the robotic arm may then remove the cassette from the drive unit and replace the cassette within the storage library.

It is desired that selection, removal, and placement of a cartridge in a drive unit be accomplished as fast as possible, as computer systems have been incrementally increasing in their processing speeds. Because of these speeds, it is desired to archive and retrieve cartridges for placement within a drive unit as quickly as possible, so that the drive unit does not incur significant down time, during which it could otherwise be reading data from cartridges.

In aid of speeding this process, robotic systems such as those generally discussed above may be combined with a bar code scanner or other optical scanner to provide known locations of cartridges within a storage library, so that a desired cartridge may be chosen from a plurality of cartridges stored within the library. However, there are certain problems with the robotics and scanning of these known systems. First, the robotic arm often does not properly place or replace the cartridge within the library, thereby causing the cartridge to "bounce back" and not be secured within the library. Second, the requirement of optically scanning cartridges within the library is time consuming. Other problems relating to bar code scanning include the following: if a cartridge is not coded, or the code is nonreadable (i.e. defective or damaged label or unreadable label format), the scanner cannot identify the cartridge, and a system failure may result. Additionally, if a cartridge is not labeled or the label is not identifiable to the system, the system may try to place another cartridge in the same slot, thereby causing damage to the system and failure. Therefore, purely optical (scanner) methods are not ideal for cartridge identification and location information.

SUMMARY OF THE INVENTION

The present invention is directed to locating, handling and loading cartridge style media, for example those used in mass storage data systems. More specifically, the present invention is directed to: (1) rapid cartridge insertion and holding; (2) rapid scannerless and/or barcoderless cartridge inventory; (3) teach-mode probe functioning; and (4) a real-time cartridge position locator.

The present invention in a broad aspect comprises an apparatus for use in archival and retrieval of data cartridges to and from a storage library, including a carriage assembly; first and second fingers disposed in opposing relation and adapted to grip and release the data cartridges, the fingers being movably connected to the carriage assembly; a roller-inserter to contact the data cartridges and located between the first and second fingers and translatable along a radial axis extending from the carriage assembly; and a first sensor located on the carriage assembly for sensing position information of the roller-inserter with respect to the carriage assembly.

In an exemplary embodiment, an apparatus according to the present invention may include a base assembly adapted to receive and support the carriage assembly. Also, the apparatus may include a plurality of first sensors located on the carriage assembly. Additionally, the present invention may include a second sensor, such as a bar code reader, for determining an identification code for each of the data cartridges. The present invention may also include a memory unit to store position information, and a base controller to control the base assembly.

The present invention also includes a method of performing inventory of a plurality of cartridges stored within a plurality of storage bins of a data storage system, comprising: positioning a roller-inserter in a plane of an array of the storage bins; moving the roller-inserter along the plane so that the roller-inserter contacts at least some of the cartridges located within the storage bins; sensing the contact of the cartridges and the roller-inserter; and storing signals corresponding to location information of the contact of the roller-inserter and the cartridges within the storage bins within a memory unit, thereby creating the inventory.

The present invention also includes a method of determining a position of a datum target having a main surface and an edge surface, for use in accessing data cartridges within a mass memory storage system, comprising: positioning a roller-inserter to contact the main surface; sensing the main surface contact position; storing within a memory unit first position information corresponding to the main surface contact position; moving the roller-inserter such that the roller-inserter slidably moves off of the main surface and contacts the edge surface; sensing the edge surface contact position; and storing within the memory unit second position information corresponding to the edge surface contact position.

The present invention provides an apparatus to permit rapid cartridge insertion and holding in a desired location, such as a drive unit or storage bin. In operation of the system, after partial placement of a cartridge into a drive unit or storage bin, a gripper assembly opens, and a spring-loaded roller-inserter completes insertion of the cartridge into the desired location. The roller-inserter then holds the cartridge to prevent "bounce back." The present invention therefore insures that a cartridge remains seated in its storage location and does not protrude, such as does a bounced cartridge. The present invention is also useful in connection with a drive operation in which a cartridge is loaded into a drive unit. Under such operation, the present invention provides a cartridge loaded sensor that remains in the loaded state and prevents load errors from occurring.

The present invention also provides for rapid scannerless and/or barcoderless inventory. In operation of this embodiment of the present invention, a roller-inserter enables the present invention to perform an inventory of stored cartridges in a rapid method, in which no scanning nor barcode reading is required. In operation, the roller-inserter is positioned into a plane of an array of storage cartridges. Rapid vertical sweeps up or down of the roller-inserter are performed, thereby activating a sensor with each cartridge that the roller-inserter contacts. The sensor activation data is stored in the software database used for cartridge inventory. Thus, the present invention permits a rapid inventory of cartridges as compared to scanning or barcoding methods.

After the system has an inventory of the location of the cartridges, the system then may perform bar code analysis to determine the location of specific cartridges. This bar code analysis uses a scanner which identifies each present cartridge by scanning the label on the cartridge. As long as the label has not been omitted, damaged or applied unevenly, making it impossible to identify the cartridge, the scanner will operate properly. The scanner feature acts as the "eye" of the system and provides an optical scanning of cartridges. If the scanner does not properly function, "touch" is an alternative method of permitting identification of cartridges in which the roller-inserter mechanically senses position of cartridges. Location or presence detection is provided by the roller-inserter.

The present invention may operate with hybrid functionality by first locating all cartridges (a very fast procedure) (i.e., by the roller-inserter), and then identifying the cartridges (a slower procedure) (i.e., by means of bar coding), thereby permitting the system to know which cartridges are present and have label problems.

The present invention also provides a teach-mode probe function, in which loading of actual machine target or fiducial points into control software is accomplished. This function may also be accomplished by a roller-inserter. In operation, the roller-inserter is moved into a plane of the datum surface and a sensor state is changed, which also deflects a set of compression springs. Then, by moving in either a vertical or horizontal direction, the spring-loaded roller-inserter will slide off the edge of the datum surface, thereby signaling the physical, actual location of the datum edge. This process is then repeated for the remaining edge (i.e., X and Y components of the datum location) to give a three-dimensional location of the datum target.

The present invention also provides a real-time cartridge position locator. In operation, the roller-inserter may touch a cartridge before any other part of the mechanism. When the roller-inserter moves slightly, due to contact with the cartridge, it signals the location of the cartridge. This contact point, or change in state location, may then be used as a datum reference point from which to reference a proper distance for successful cartridge access. This can be accomplished during the cartridge access movement, and thus in real-time system use versus a teach-mode routine. The ability to create a three-dimensional model of the cartridge positions in the array is extremely desirable. The robotics of the system must compensate for variations in the depth of the of cartridges (Z dimension) to reliably store and retrieve cartridges. Dropped cartridges or jamming within the storage arrays may occur if such position information is not available or used.

DESCRIPTION OF ILLUSTRATIVE EMBODIMENTS

Figure 1:
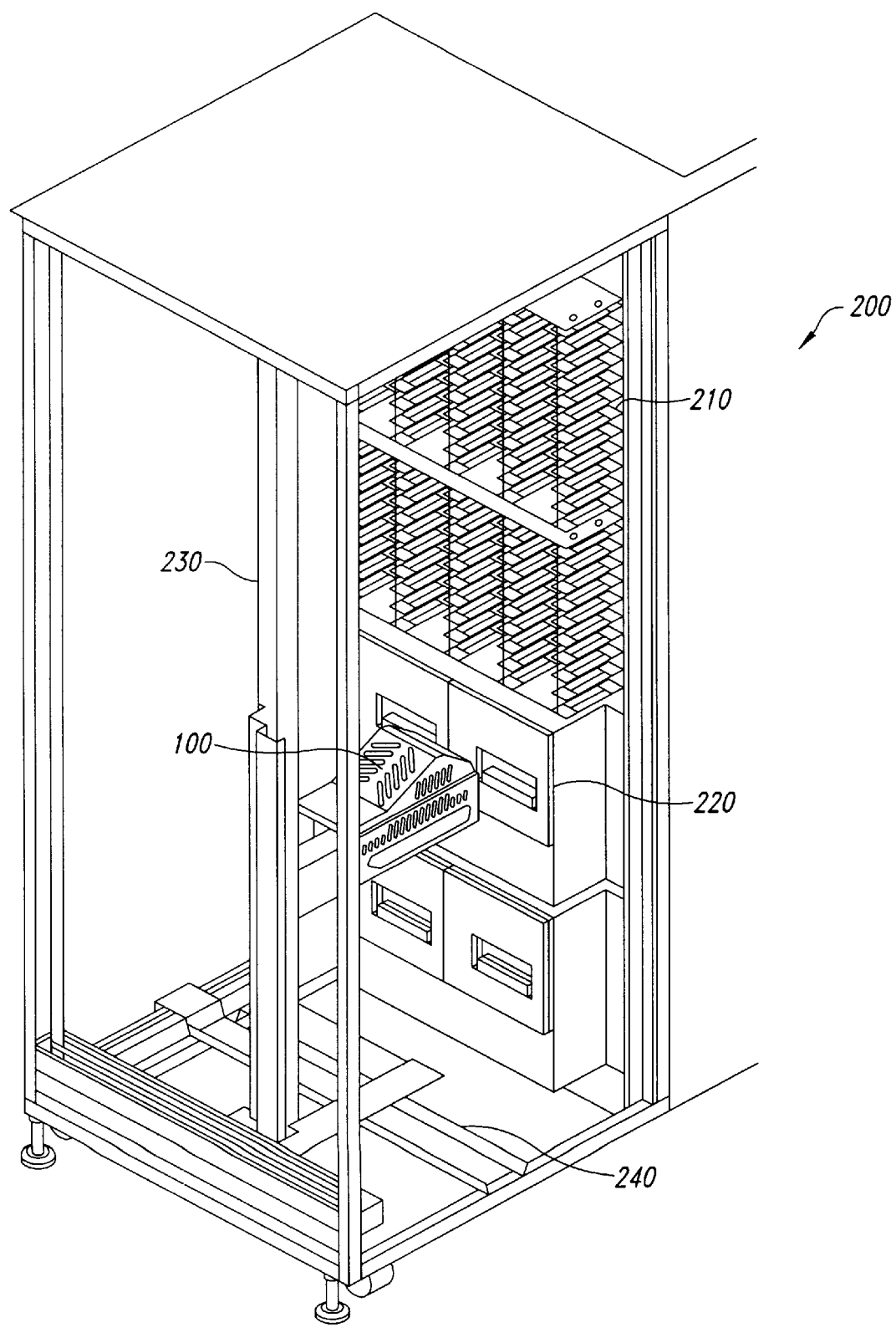
FIG. 1 is a schematic of a data storage system according to the present invention.

FIG. 1 shows a data storage system or mass memory storage system according to the present invention. As shown in FIG. 1, the data storage system 200 includes a plurality of storage bins or storage locations 210, a plurality of drive units 220, and a base assembly 100. Base assembly 100 is secured to a post 230. In exemplary embodiments, the storage locations 210 may be made of plastic or metal and organized as a plurality of shelf-like units, and sized to accommodate data cartridges. Particular cartridges used in connection with the data storage system 200 may include, for example, 3480, 3490, or DLT series cartridges.

In an exemplary embodiment, base assembly 100 may be connected to post 230 by means of a roller-bearing assembly (not shown in FIG. 1). Other means of connecting base assembly 100 to post 230 that permit vertical translation may be used. Post 230 is secured to a platform 240 at the lower portion of system 200. The platform 240 permits the post 230 and attached base assembly 100 to move horizontally along the width of the platform 240. Post 230 permits the base assembly 100 to move vertically. Although shown with one module, data storage system 200 may include a plurality of modules interconnected so that the base assembly 100 may travel freely between the modules.

Figure 2A:
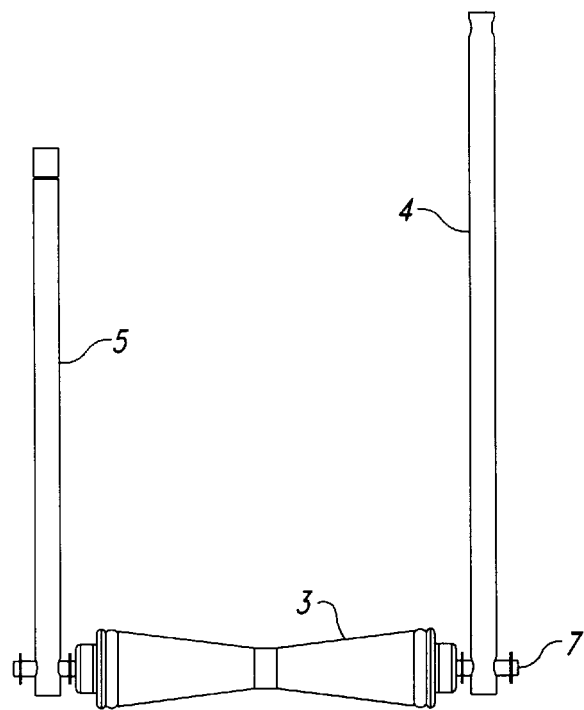
FIG. 2A is a schematic of a roller-inserter according to the present invention.
Figure 2B:
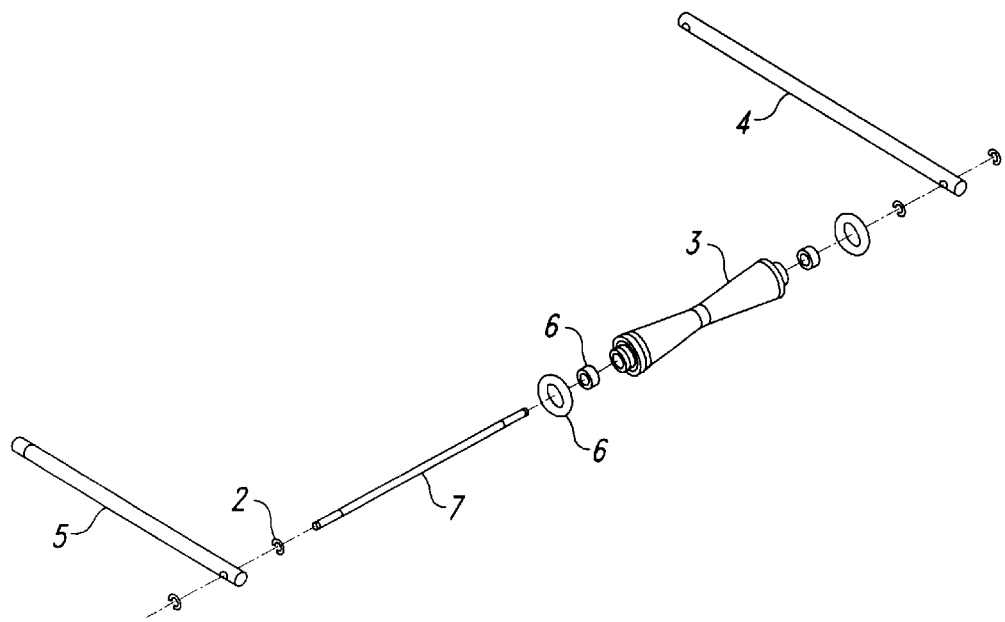
FIG. 2B is an exploded view of a roller-inserter according to the present invention.

FIG. 2A shows a roller-inserter 3 according to the present invention. FIG. 2A shows a roller-inserter 3 attached to shaft 4 and shaft 5. Roller-inserter 3 may be comprised of a hard rubber or plastic material such as polycarbonate, or acetyl. In an exemplary embodiment, roller-inserter 3 is connected to shaft 4 and shaft 5 by means of pin 7. The pin 7 may be connected through openings in the bottom of shaft 4 and shaft 5, thereby permitting free rolling of the roller-inserter 3. As shown in FIG. 2B additionally, a plurality of clips 2, such as e-clips, may be connected between the pin 7 and roller-inserter 3. One or more washers 6, preferably rubber washers, may be also be adapted around the perimeter of roller-inserter 3 to provide for proper contacting of roller-inserter 3 with the cartridges located within the mass memory storage system 100. The washers 6 also provide a soft interface between roller-inserter 3 and a cartridge, and also minimize noise during use. Instead of the clips and washers discussed above, other devices, such as an O-ring, may be used to ensure that roller-inserter 3 moves freely. Additionally, a plurality of ball bearings (not shown in FIG. 2B) may be pressed into the ends of the roller-inserter 3 to provide a smooth rolling interface. As shown in FIG. 2A, roller-inserter 3 has a concave shape for clearance with the fingers, however, it is contemplated that other shapes such as spherical, convex, oval, or other such shapes may be used.

In an exemplary embodiment, the shaft 4 and shaft 5 may be of different lengths so that they may be attached to and inserted within a carriage grip assembly constructed according to the present invention. However, it is possible for shaft 4 and shaft 5 to be of the same length.

Figure 3A:
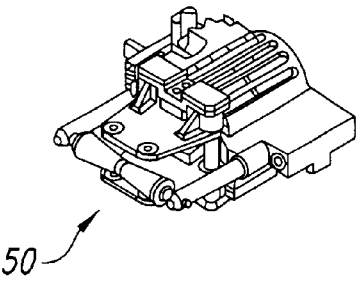
FIG. 3A is an illustration of a carriage-grip assembly according to the present invention.
Figure 3B:
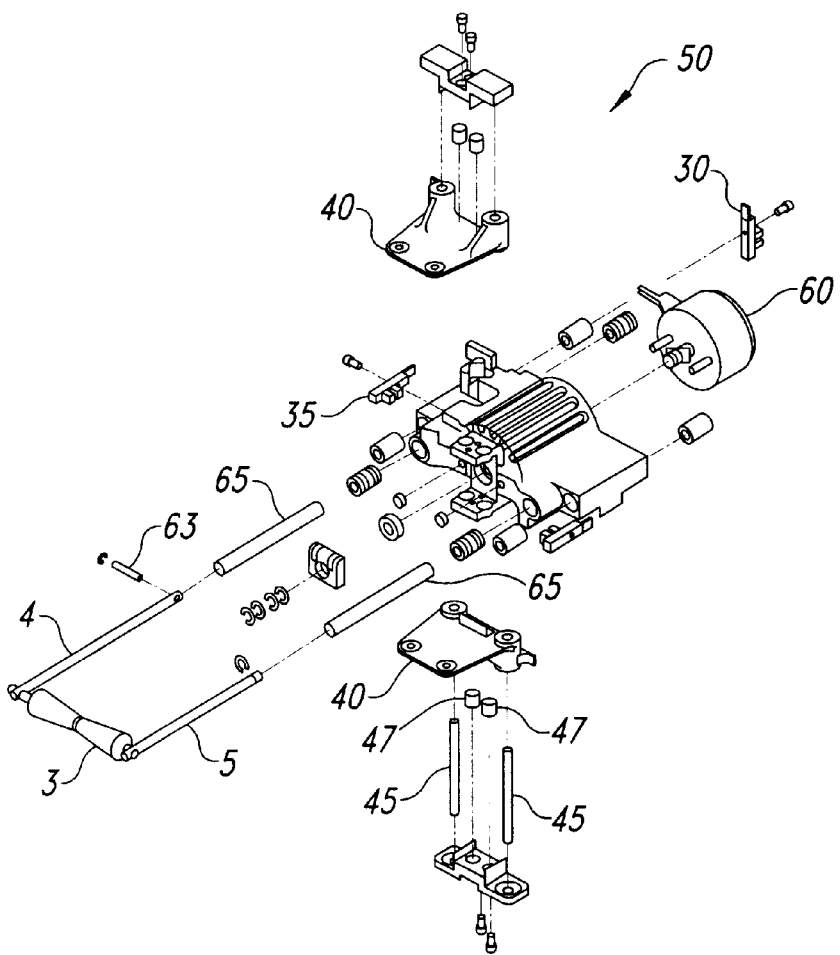
FIG. 3B is an exploded view of a carriage-grip assembly according to the present invention.
Figure 4:
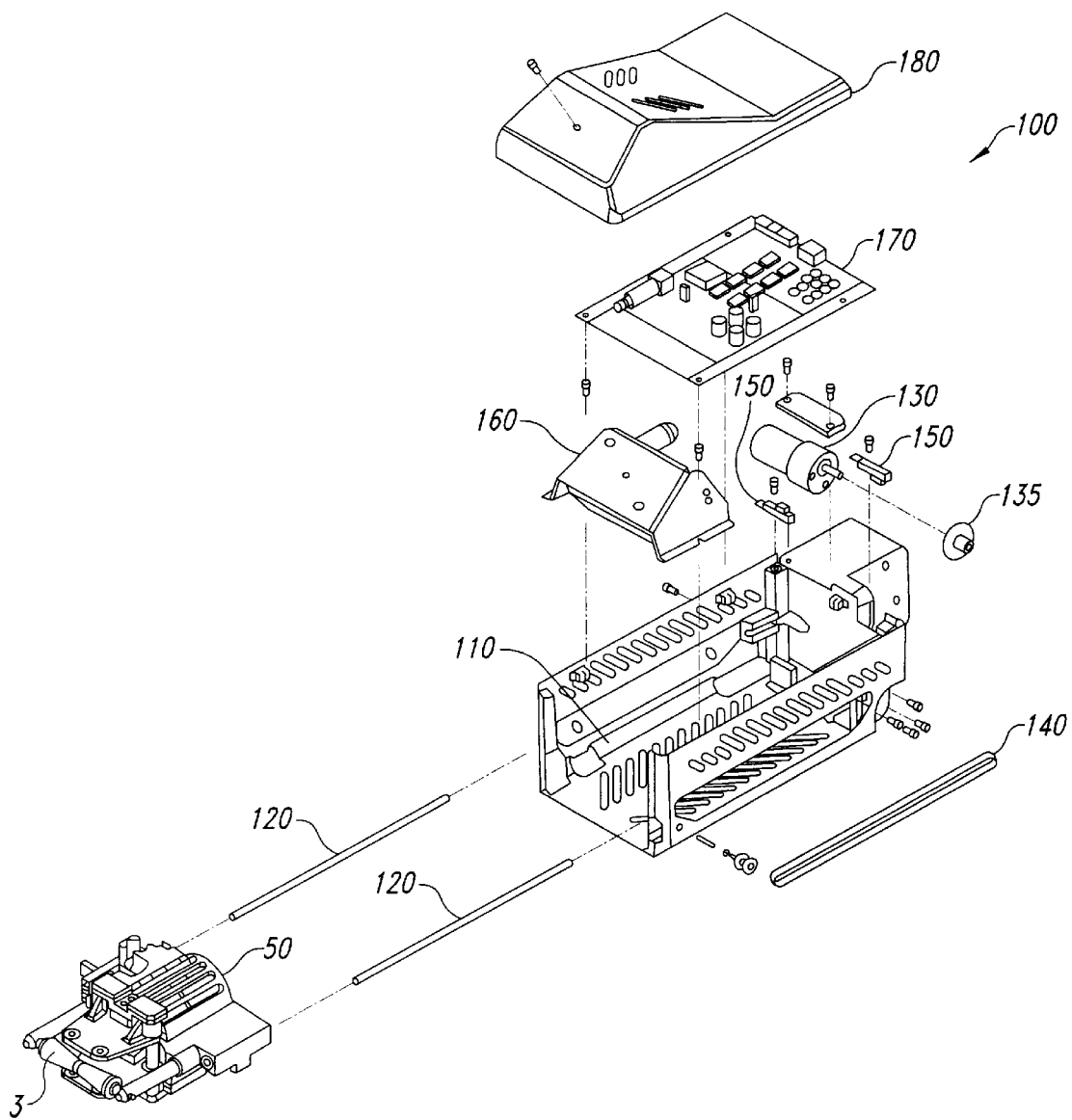
FIG. 4 is an exploded view of a base assembly according to the present invention.

FIG. 3A is an illustration of a carriage gripper according to the present invention. FIG. 3B shows an exploded view of a carriage gripper or carriage grip assembly 50 according to the present invention. Power for translation (in and out) of carriage gripper 50 is supplied by motor 130 (shown in FIG. 4), which is attached at the rear of base assembly 100. In other embodiments, other devices may provide the energy required for movement of the carriage gripper 50.

At the rear of carriage grip 50 is a first sensor 30 which is used to sense contact between roller-inserter 3 and a cartridge in the mass memory storage system 200. A second sensor 35 is connected to a side of carriage grip assembly 50 for detecting a cartridge gripped in the fingers. In an exemplary embodiment, first sensor 30 and second sensor 35 may be optical-type sensors. However, each sensor need not be the same type or size. Information received by the sensors is input into logic cards (not shown) located in the rear of the base assembly 100 (discussed infra). Sensor data is stored in a software log of system activity located in the logic cards, known as the library system cards.

The front of carriage grip 50 comprises a pair of fingers 40 located opposite each other to provide for gripping, removal, and replacement of a cartridge from and to the mass memory storage system 200. The fingers 40 may be spaced apart by a plurality of rods 45. The rods 45 provide for spacing between the fingers. Control of spacing between the fingers 40 may be supplemented by a plurality of springs 47 which permit the fingers 40 to move in relation to each other. A solenoid 60 actuates finger movement (to open fingers), and the springs 47 close the fingers.

Located outwardly from the fingers 40 is the roller-inserter 3, which is connected to the carriage grip 50 by shaft 4 and shaft 5. Disposed around shaft 4 and shaft 5 are springs 65, preferably compression springs, which permit movement of the roller-inserter 3 with respect to the carriage grip 50. Instead of springs 65, movement of the roller-inserter 3 may be accomplished by means of a lead screw. Also external to at least one shaft may be a pin 63. The pin 63 may be used to stop travel of roller-inserter 3. Additionally, the pin 63 serves as a flag for the first sensor 30 to sense position of the roller-inserter 3. The first sensor 30 also may be known as the cartridge loaded sensor. The cartridge loaded sensor operates as follows: the roller-inserter 3 has a "flag", i.e., pin 63 that protrudes from the side of one of the shafts of the mechanism. The mechanism as a whole is spring-loaded and is pushed backwards upon selection of a cartridge. The flag in this position thus blocks the optical sensor in its initial state. When the roller-inserter 3 begins to move away from the first sensor 30, the first sensor 30 changes state, and the system "knows" that the robot has a cartridge in the fingers 40. The second sensor 35 is the home sensor for the entire carriage (i.e. the reach motion is calibrated by moving backwards into this flag, which may be a feature machined into the carriage assembly).

In an exemplary embodiment, roller-inserter 3 may move horizontally with respect to the carriage grip assembly 50 and fingers 40 may move vertically with respect to the carriage grip assembly 50.

Base assembly 100 receives carriage gripper 50 in a port 110. Port 110 may receive carriage grip 50 by means of a plurality of shafts 120 upon which carriage grip 50 may be slidably attached. The carriage grip 50 may move relative to the base assembly 100. Base assembly 100 is controlled by a motor 130, which may be connected via sprocket 135 to a belt 140, which permits movement of base assembly 100 along a vertical axis. Instead of motor 130, other means of moving base assembly 100 may be used.

Base assembly 100 further comprises a plurality of sensors 150 for determining contact between roller-inserter 3 and cartridges of the mass memory storage system 200. In an exemplary embodiment, the sensors 150 may be optical or mechanical limit switches. However, each sensor 150 need not be the same type or size. Information received by the sensors is input into library system cards.

A scan bracket 160 may be connected to a top side of base assembly 100 to provide a port for the sensors 150 to scan for desired information. The scan bracket 160 may be made of a resilient plastic material, and may have an "eye," that permits the sensors 150 to transmit and receive signals (i.e. infrared radiation). The sensors 150 may be standard commercial barcode scanners, such as those used in a grocery store. Additionally, base assembly 100 may include a base card 170. The base card 170 generally comprises power distribution and conditioning functions. The base card 170 may permit controls for manual operation of the system. Both the scan bracket 160 and the base card 170 may be located underneath a cover 180, which provides environmental protection for the internal components of base assembly 100.

Further modification and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size, and arrangement of parts. For example, equivalent elements or materials may be substituted for those illustrated and described herein, and certain features of the invention may be utilized independently of the use of other features, all as would be apparent to one skilled in the art after having benefit of this description of the invention.

What is claimed is:

1. An apparatus for use in archival and retrieval of data cartridges to and from a storage library, said storage library comprising a plurality of storage bins in which said data cartridges are maintained, comprising:

a carriage assembly positioned adjacent to said storage bins and selectively movable between said storage bins to position said carriage assembly adjacent to a desired one of said storage bins;

first and second finger members supported by said carriage assembly for movement therewith, said first and second finger members being configured with at least one of said first and second finger members selectively movable relative to the other to selectively grip and release a desired one of said data cartridges therebetween, said first finger member disposed in opposing relation to said second finger member to grip said desired one of said data cartridges therebetween when said at least one of said first and second finger members is moved toward the other;

a first motive source operatively connected to said at least one of said first and second finger members to move said at least one of said first and second finger members relative to the other to selectively grip or release said desired one of said data cartridges therebetween;

a roller-inserter supported by said carriage assembly for movement therewith and in position to contact said data cartridge in said desired one of said storage bins adjacent to which said carriage assembly is positioned, said roller-inserter being located between said first and second finger members, said roller-inserter being movably mounted to move toward said carriage assembly in response to contact with said data cartridge in said desired one of said storage bins adjacent to which said carriage assembly is positioned; and at least one sensor supported by said carriage assembly for movement therewith and in position to sense contact of said roller-inserter with said data cartridge in said desired one of said storage bins adjacent to which said carriage assembly is positioned.

2. The apparatus of claim 1, wherein said first and second finger members are held in spaced apart relation at least in part by at least one spring member.

3. The apparatus of claim 1, further comprising a base assembly adapted to receive and support said carriage assembly, said base assembly being selectively movable to selectively move said carriage assembly between said storage bins.

4. The apparatus of claim 1 wherein said at least one sensor comprises a plurality of sensors located on said carriage assembly and positioned to sense movement of said roller-inserter toward said carriage assembly when in contact with one of said data cartridges and to provide position information on said roller-inserter.

5. The apparatus of claim 1, further comprising a second sensor supported by said carriage assembly for movement therewith and in position to determine an identification code of said data cartridge contacted by said roller-inverter in said desired one of said storage bins adjacent to which said carriage assembly is positioned.

6. The apparatus of claim 5, wherein said second sensor comprises a bar code reader.

7. The apparatus of claim 1, further comprising a flag located proximate to said roller-inserter, said at least one sensor configured to sense position information of said roller-inserter, said flag being indicative of said position information of said roller-inserter.

8. The apparatus of claim 1 wherein said at least one sensor is configured to sense position information of said roller-inserter, and said roller-inserter has a flag attached thereto and located in view of said at least one first sensor, said flag being indicative of said position information.

9. The apparatus of claim 1, wherein said roller-inserter comprises a concave shape.

10. The apparatus of claim 1, wherein said roller-inserter is rollably supported on at least one member extending from said carriage assembly toward said storage bins, said extending member being movable toward said carriage assembly in response to contract of said roller-inserter with said data cartridge in said desired one of said storage bins adjacent to which said carriage assembly is positioned.

11. The apparatus of claim 10, further comprising at least one spring biasing said extending member to a position holding said roller-inserter away from said carriage assembly.

12. The apparatus of claim 1, further comprising a motor to provide power to move said carriage assembly between said storage bins.

13. The apparatus of claim 1 wherein said at least one sensor further senses movement of said roller-inserter toward said carriage assembly when in contact with said data cartridge in said desired one of said storage bins adjacent to which said carriage assembly is positioned.

14. The apparatus of claim 1 wherein said at least one sensor provides position information on the position to which said roller-inserter moves toward said carriage assembly when said roller-inserter is moved into contact with said data cartridge in said desired one of said storage bins adjacent to which said carriage assembly is positioned.

15. The apparatus of claim 14, further comprising a memory unit to store said position information.

16. The apparatus of claim 15, further comprising a controller.

17. The apparatus of claim 1 wherein said roller-inserter is located between said first and second finger members in position such that when said at least one sensor senses contact of said roller-inserter with said data cartridge in said desired one of said storage bins adjacent to which said carriage assembly is positioned, said data cartridge is positioned between said first and second finger members in position to be gripped therebetween.

18. An apparatus for use in archival and retrieval of data cartridges to and from a storage library, said storage library comprising a plurality of storage bins in which said data cartridges are maintained, comprising:

a carriage assembly movable between said storage bins to selectively position said carriage assembly adjacent to selected ones of said storage bins;

first and second finger members supported by said carriage assembly for movement therewith, said first and second finger members being configured with at least one of said first and second finger members selectively movable relative to the other to selectively grip and release a desired one of said data cartridges therebetween, said first finger member disposed in opposing relation to said second finger member to grip said desired one of said data cartridges therebetween when said at least one of said first and second finger members is moved toward the other;

a first motive source operatively connected to said at least one of said first and second finger members to move said at least one of said first and second finger members relative to the other to selectively grip or release said desired one of said data cartridges therebetween;

a cartridge contract member supported by said carriage assembly for movement therewith and in position to contact said data cartridges in said storage bins to which said carriage assembly is moved, said cartridge contact member being located adjacent to at least one of said first and second finger members, said cartridge contact member being movably mounted to move toward said carriage assembly in response to contact with said data cartridges in said storage bins to which said carriage assembly is moved; and at least one sensor supported by said carriage assembly for movement therewith and in position to sense contact of said cartridge contact member with said data cartridges in said storage bins to which said carriage assembly is moved.

19. The apparatus of claim 18, further comprising a base assembly adapted to receive and support said carriage assembly, said base assembly being selectively movable to selectively move said carriage assembly between said storage bins.

20. The apparatus of claim 18 wherein said at least one sensor comprises a plurality of sensors located on said carriage assembly and positioned to sense movement of said cartridge contact member toward said carriage assembly when in contact with one of said data cartridges and to provide position information on said cartridge contact member.

21. The apparatus of claim 18, further comprising a second sensor supported by said carriage assembly for movement therewith and in position to determine identification codes of said data cartridges contacted by said cartridge contact member in said storage bins to which said carriage assembly is moved.

22. The apparatus of claim 21, wherein said second sensor comprises a bar code reader.

23. The apparatus of claim 18, wherein said cartridge contact member includes a rollable member which contacts said data cartridges, and said rollable member is supported toward a distal end portion of at least one member extending from said carriage assembly toward said storage bins, said extending member being movable toward said carriage assembly in response to contract of said rollable member with said data cartridges in said storage bins to which said carriage assembly is moved.

24. The apparatus of claim 23, further comprising at least one spring biasing said extending member to a position holding said rollable member spaced away from said carriage assembly.

25. The apparatus of claim 18 wherein said at least one sensor further senses movement of said cartridge contact member toward said carriage assembly when in contact with said data cartridges in said storage bins to which said carriage assembly is moved.

26. The apparatus of claim 18 wherein said at least one sensor provides position information on the position to which said cartridge contact member moves toward said carriage assembly when said cartridge contact member is moved into contact with said data cartridges in said storage bins to which said carriage assembly is moved.

27. The apparatus of claim 18 wherein said cartridge contract member is located between said first and second finger members in position such that when said at least one sensor senses contact of said cartridge contact member with said data cartridges in said storage bins to which said carriage assembly is moved, said data cartridge is positioned between said first and second finger members in position to be gripped therebetween.

* * * * *